(12) United States Patent
Adachi et al.

(10) Patent No.: US 8,246,176 B2
(45) Date of Patent: Aug. 21, 2012

(54) PROJECTION DISPLAY DEVICE HAVING AN OPERATION SECTION FOR DISPLACING A LENS

(75) Inventors: Takaharu Adachi, Higashiosaka (JP); Shinichi Okuno, Hirakata (JP); Ryuhei Amano, Hirakata (JP); Takashi Ikeda, Higashiosaka (JP); Takashi Miwa, Higashiosaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 494 days.

(21) Appl. No.: 12/073,292

(22) Filed: Mar. 4, 2008

(65) Prior Publication Data
US 2008/0218706 A1   Sep. 11, 2008

(30) Foreign Application Priority Data

Mar. 6, 2007  (JP) ................ 2007-055979
Aug. 7, 2007  (JP) ................ 2007-205975

(51) Int. Cl.
  *G03B 21/28*  (2006.01)
  *G03B 3/00*  (2006.01)
(52) U.S. Cl. ................ 353/98; 353/101
(58) Field of Classification Search ........ 353/76, 353/101, 71–73, 79, 98, 119
  See application file for complete search history.

(56) References Cited

U.S. PATENT DOCUMENTS

| | | | | |
|---|---|---|---|---|
| 3,650,614 A | * | 3/1972 | Shimoda et al. ........ | 353/72 |
| 4,358,184 A | * | 11/1982 | Schmidt ........ | 353/119 |
| 5,396,301 A | | 3/1995 | Sasaki et al. | |
| 2003/0137639 A1 | | 7/2003 | Yang | |
| 2003/0164926 A1 | * | 9/2003 | Nakano et al. ........ | 353/31 |
| 2004/0179172 A1 | | 9/2004 | Kobayashi et al. | |
| 2005/0151935 A1 | * | 7/2005 | Ariyoshi ........ | 353/79 |
| 2006/0092338 A1 | | 5/2006 | Sakai et al. | |
| 2006/0092384 A1 | | 5/2006 | Kuroda | |
| 2006/0181684 A1 | * | 8/2006 | Hermanson et al. ........ | 353/31 |

FOREIGN PATENT DOCUMENTS

| | | |
|---|---|---|
| CN | 1261812 C | 6/2006 |
| JP | 64-91129 A | 4/1989 |
| JP | 3-73924 U | 7/1991 |
| JP | 5-100312 A | 4/1993 |
| JP | 5-61747 U | 8/1993 |
| JP | 05-207405 A | 8/1993 |
| JP | 10-260473 A | 9/1998 |

(Continued)

OTHER PUBLICATIONS

Chinese Office Action dated Jul. 2, 2010, issued in corresponding Chinese Patent Application No. 200810082483.9.

(Continued)

*Primary Examiner* — Thanh X Luu
(74) *Attorney, Agent, or Firm* — Westerman, Hattori, Daniels & Adrian, LLP

(57) ABSTRACT

A projection display device comprises a projection lens section to which light modulated by a light modulating element is entered, a mirror section for reflecting the light emitted from the projection lens section to reflect to the projection lens section side and directing the light to a projection plane, and an operation section for displacing a lens in the projection lens section. The operation section is disposed in a region in which the operation section does not hinder an optical path of the light that has been passed through a projection port provided in a main body cabinet.

4 Claims, 14 Drawing Sheets

FOREIGN PATENT DOCUMENTS

| | | |
|---|---|---|
| JP | 2002-228910 A | 8/2002 |
| JP | 2003-024143 A | 1/2003 |
| JP | 2003-215699 A | 7/2003 |
| JP | 2003-215702 A | 7/2003 |
| JP | 2004-258620 A | 9/2004 |
| JP | 2004-279695 A | 10/2004 |
| JP | 2006-133273 A | 5/2006 |
| JP | 2006-133419 A | 5/2006 |
| JP | 2006-133689 A | 5/2006 |
| JP | 2006-195318 A | 7/2006 |
| JP | 2006-201328 A | 8/2006 |
| JP | 2007-047436 A | 2/2007 |
| JP | 2008-158495 A | 7/2008 |

OTHER PUBLICATIONS

Japaneses Office Action dated Feb. 15, 2011, issued in corresponding Japanese Patent Application No. 2007-205975.

Japanese Notification of Reasons for Refusal dated May 17, 2011, issued in corresponding Japanese Patent Application No. 2007-205975.

* cited by examiner

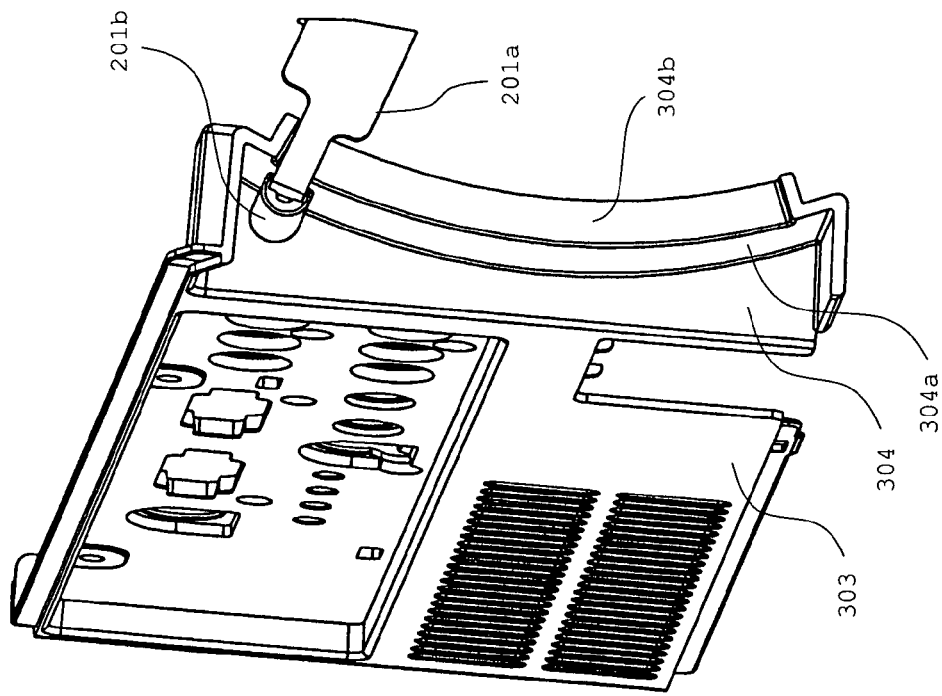
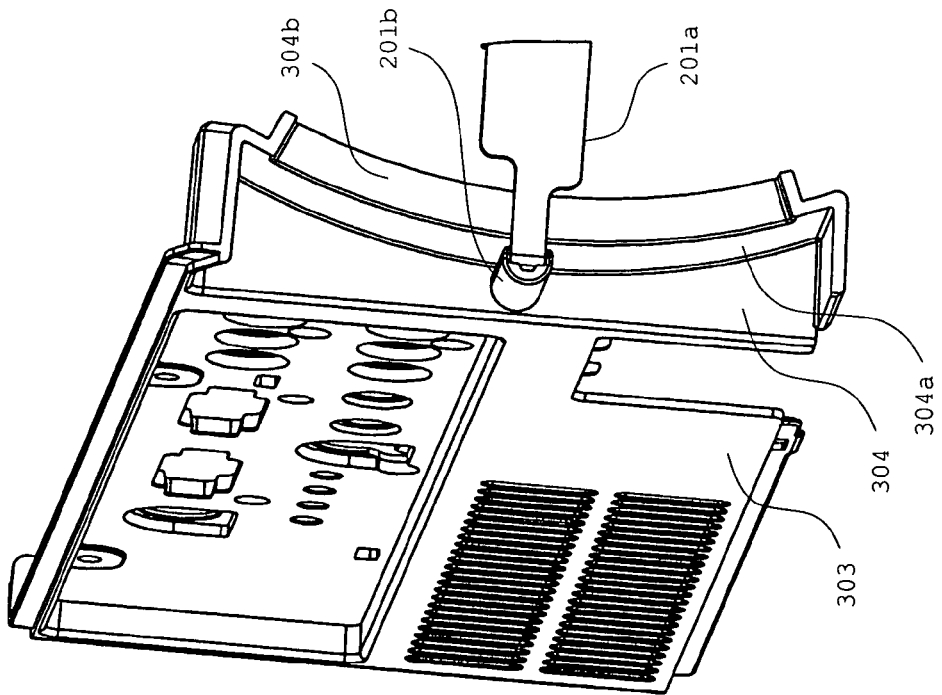

PROJECTION DISPLAY DEVICE HAVING AN OPERATION SECTION FOR DISPLACING A LENS

This application claims priority under 35 U.S.C. Section 119 of Japanese Patent Application No. 2007-055979 filed Mar. 6, 2007, entitled "PROJECTION DISPLAY DEVICE" and Japanese Patent Application No. 2007-205975 filed Aug. 7, 2007, entitled "PROJECTION DISPLAY DEVICE".

BACKGROUND OF THE INVENTION

1. Field of the Invention

The present invention relates to a projection display device for enlarging and projecting an image on a display element on a projection plane, and is particularly preferable for being used as a projection display device in which an image on the display element is formed as an intermediate image between a projection lens section and a reflection mirror, and this intermediate image is enlarged and projected by a reflection plane.

2. Description of the Related Art

Projection display devices (hereafter, referred to as "projectors") for enlarging and projecting an image on a display element (liquid crystal panel, or the like) on a projection plane (screen, or the like) have been commercialized and widely used. In the projectors of this sort, it is desirable to reduce a distance between the screen and the projector body.

To attain this, an arrangement for oblique projection may be used in which a projection optical system is wide-angled, and at the same time, a direction of projection light traveling is oblique to an optical axis of the projection optical system. For example, when a wide-angle lens with a large view angle is used as the projection optical system, and a display element and a screen are shifted in opposite directions to each other with regard to the optical axis of the projection optical system, a projection distance is shortened, and at the same time, oblique projection without distortion can be achieved. However, with the arrangement as mentioned, a wider-angle lens with a larger view angle is necessary, and therefore, increased costs due to a large-sized lens and a large-sized projector body pose a problem.

On the other hand, for realization of the reduced projection distance, such an arrangement is also considered that a projection lens section and a mirror are used as a projection optical system, an image on a display element is formed as an intermediate image between the projection lens section and the mirror, and the intermediate image is then enlarged and projected by the mirror.

With the projectors of this type, in general, focus adjustment and zoom adjustment are performed in a projection lens unit. For example, an operation section operated by a user is provided, operation at the operation section causes displacement of a lens position in the projection lens unit in a direction of an optical axis, and then, focus adjustment and zoom adjustment are carried out.

However, with a projector of the latter in which light from the projection lens unit is reflected by the reflection mirror, the light reflected to the projection lens unit side by the reflection mirror passes in a vicinity of the projector body. For this reason, an operation section itself may hinder the optical path, or fingers of the user manipulating the operation section may hinder the optical path depending on an arrangement of the operation section for focus and zoom adjustments, and there is a possibility that a shadow is cast on a projected image.

SUMMARY OF THE INVENTION

The projection display device according to a primary aspect of the present invention comprises a projection lens section to which light modulated by a light modulating element is entered, a mirror section for reflecting light emitted from the projection lens section to reflect to the projection lens section side and directing the light to a projection plane, an operation section for displacing a lens in the projection lens section, wherein the operation section is disposed in a region in which the operation section does not hinder an optical path of the light that has been reflected by the mirror section and passed through a projection port provided in a main body cabinet.

BRIEF DESCRIPTION OF THE DRAWINGS

The foregoing and other objects and novel features of the present invention will be more fully understood by reading a description of preferred embodiments below with reference to the accompanying drawings as follows:

FIG. 14A is a diagram illustrating a relationship of an arrangement between a knob accommodation section and the lever on a side face panel according to the embodiment; and FIG. 14B is a diagram illustrating the relationship of the arrangement between the knob accommodation section and the lever on the side face panel according to the embodiment.

Figure 1:
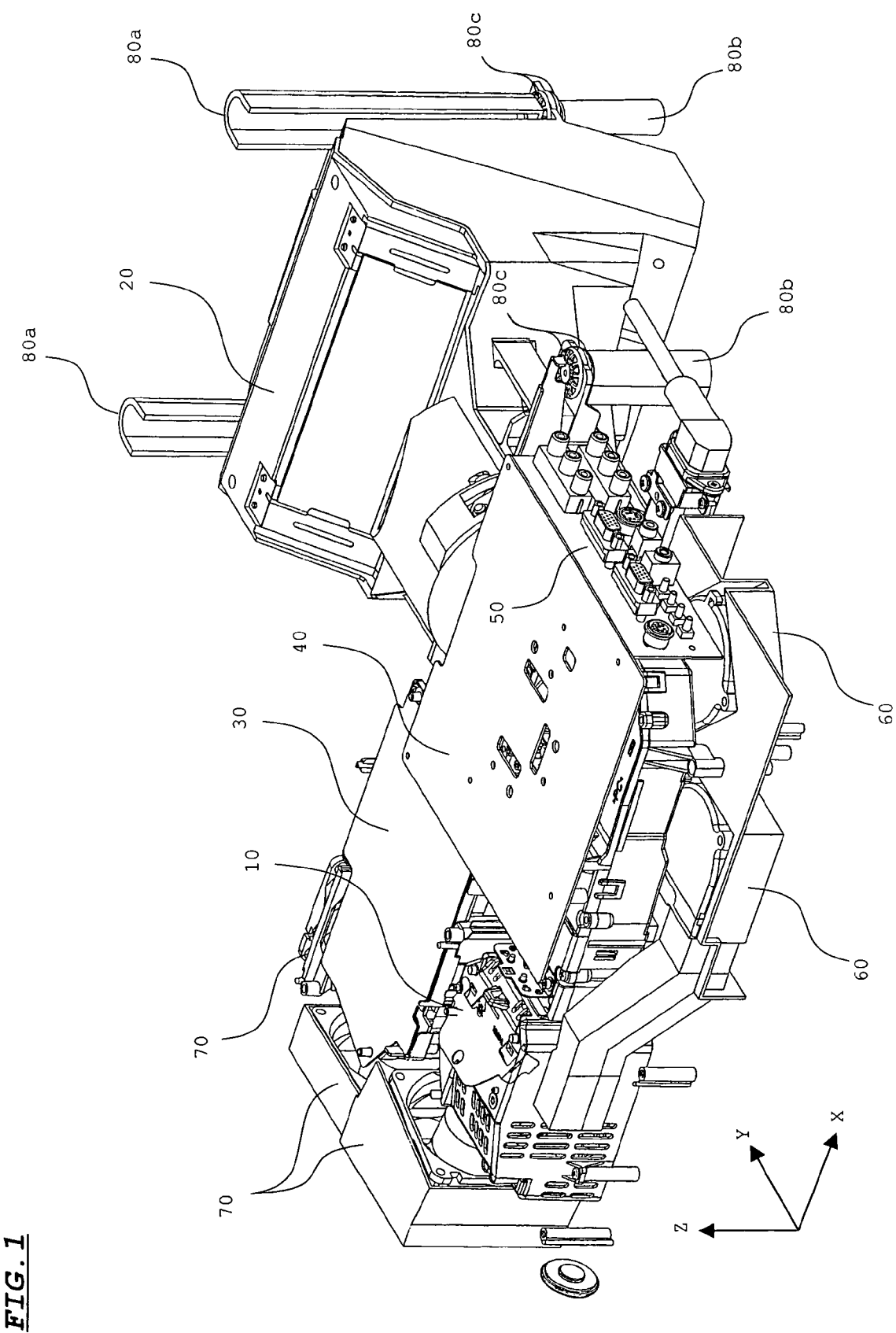
FIG. 1 is a diagram (perspective view) illustrating an arrangement of the projector according to an embodiment.

The drawings are merely intended for illustration and do not set any limits to the scope of the present invention.

DESCRIPTION OF THE PREFERRED EMBODIMENTS

Hereinafter, referring to the drawings, an arrangement of a projector according to the embodiment will be described.

Figure 8:
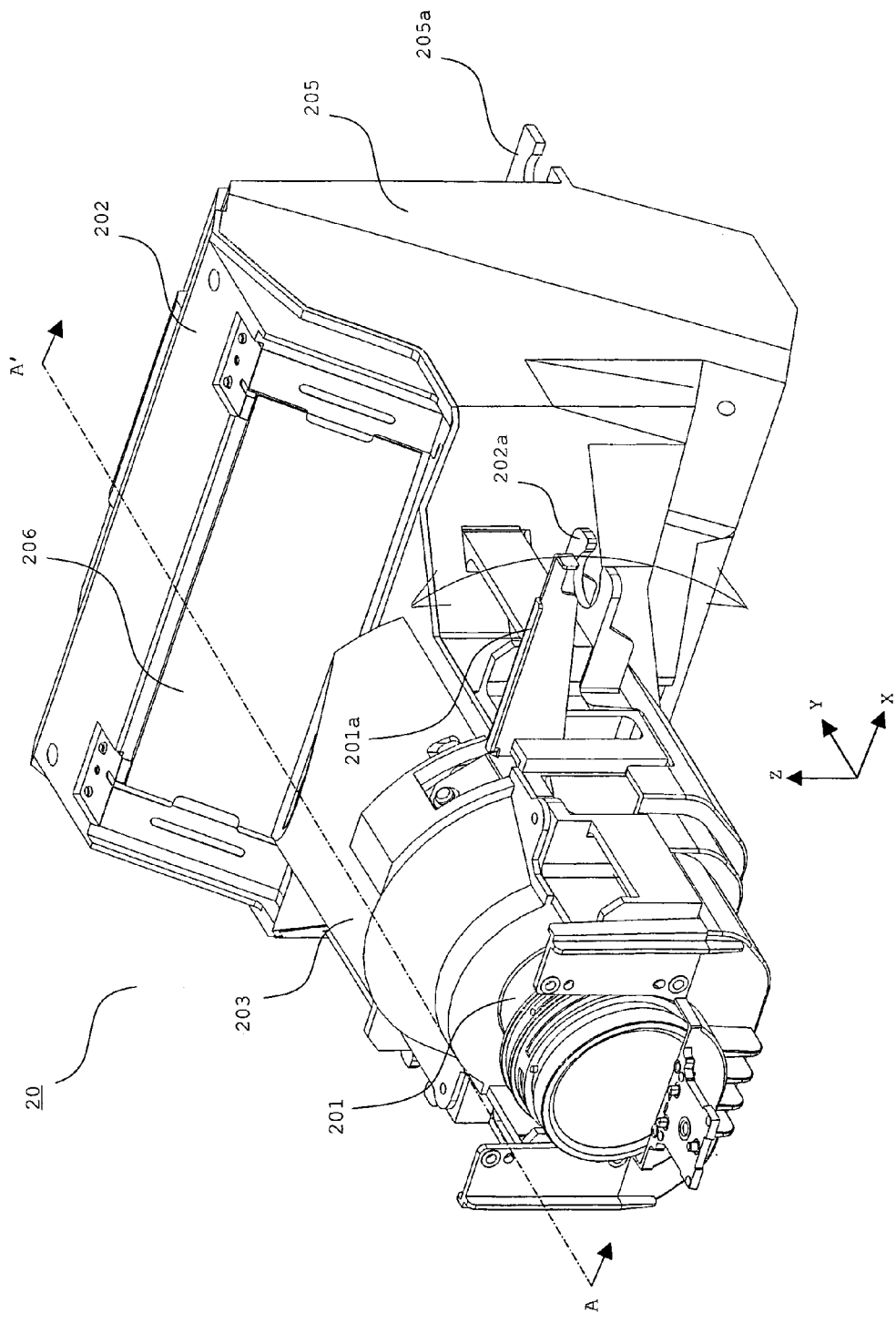
FIG. 8 is a diagram (perspective view) illustrating an arrangement of a projection optical system according to the embodiment.
Figure 9:
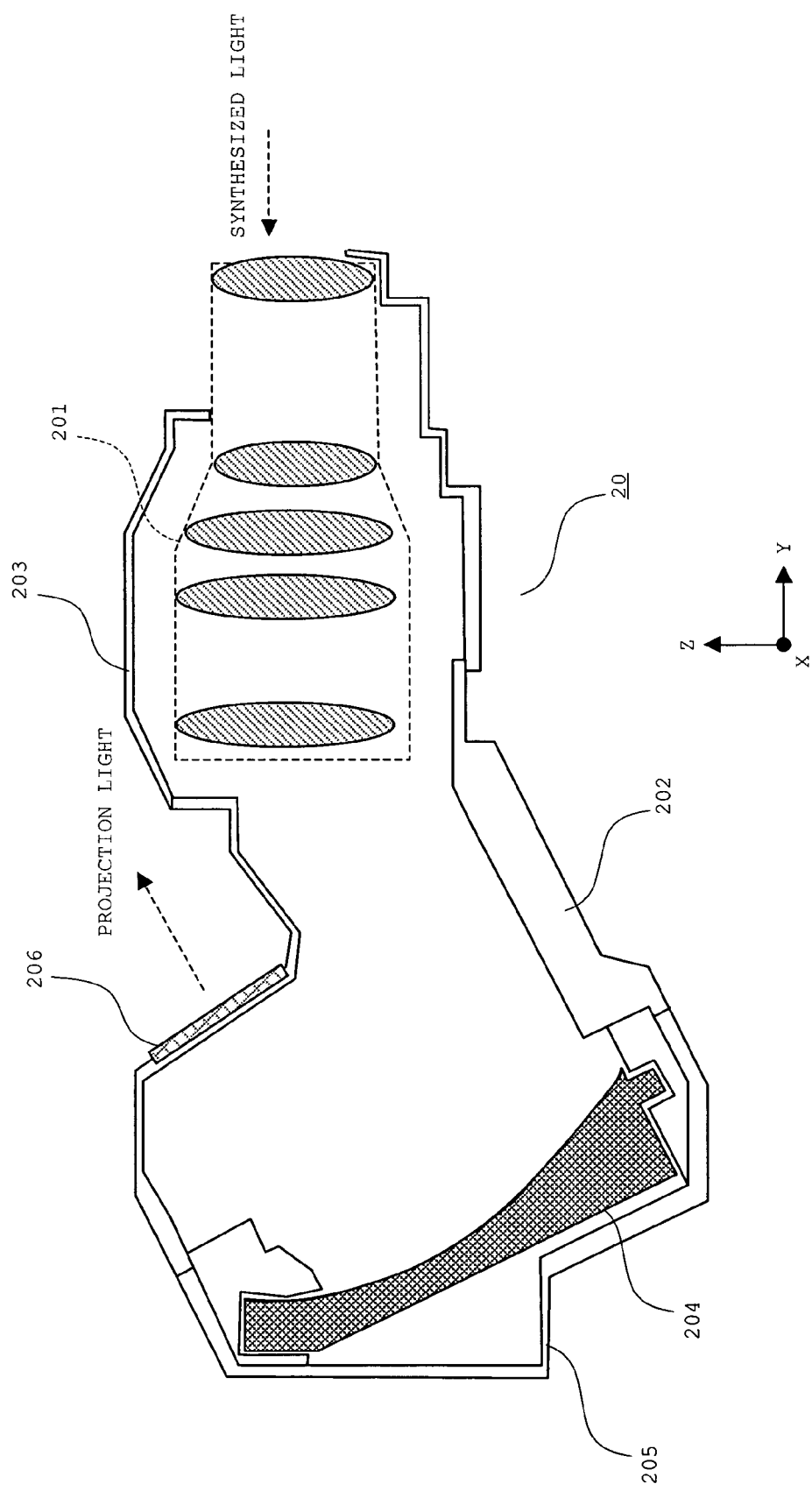
FIG. 9 is a diagram (cross-sectional view) illustrating the arrangement of the projection optical system according to the embodiment.

FIG. 1 through FIG. 7 illustrate the projector in which an external cabinet is omitted. FIG. 1 is a perspective view of the projector showing an external appearance, and FIG. 2, FIG. 3, FIG. 4, FIG. 5, FIG. 6 and FIG. 7 are respectively a top plan view, a bottom plan view, a right side view, a left side view, a front view, and a back view. FIG. 2 through FIG. 7 show the projector in a state that a main substrate 40 is removed. FIG. 8 and FIG. 9 are respectively a perspective view and a cross-sectional view (schematic view) of a projection optical system showing an external appearance.

Referring now to FIG. 1 through FIG. 7, the projector comprises an optical engine 10, a projection optical system 20, a power supply unit 30, a main substrate 40, an AV terminal section 50, a suction fan 60, an exhaust fan 70, and an AC inlet 90. Reference number 80a is a boss from a top face side of the cabinet, reference numeral 80b is a boss from a bottom face side of the cabinet, and reference numeral 80c is a bush for vibration absorption.

Figure 2:
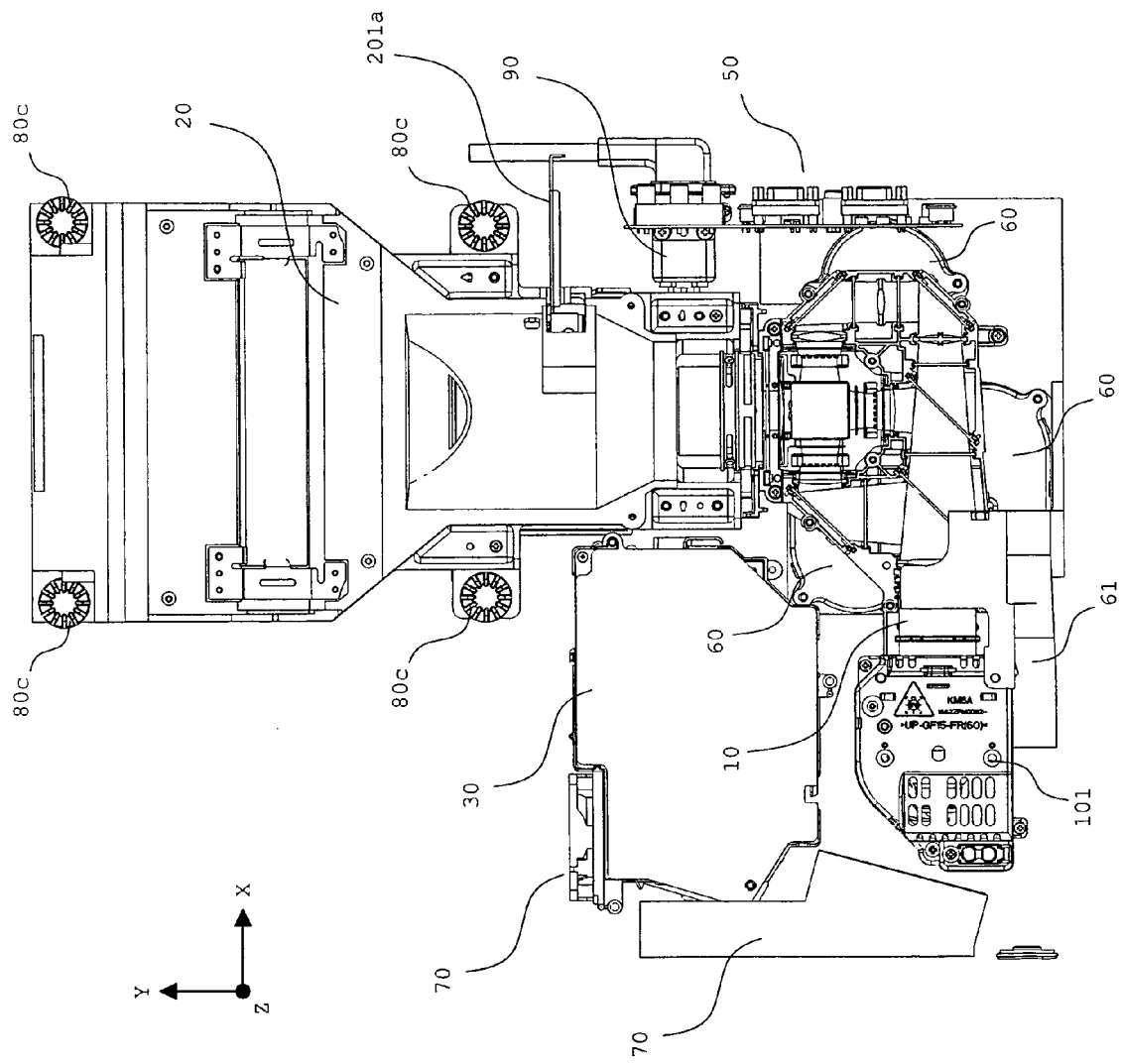
FIG. 2 is a diagram (top plan view) illustrating the arrangement of the projector according to the embodiment.
Figure 3:
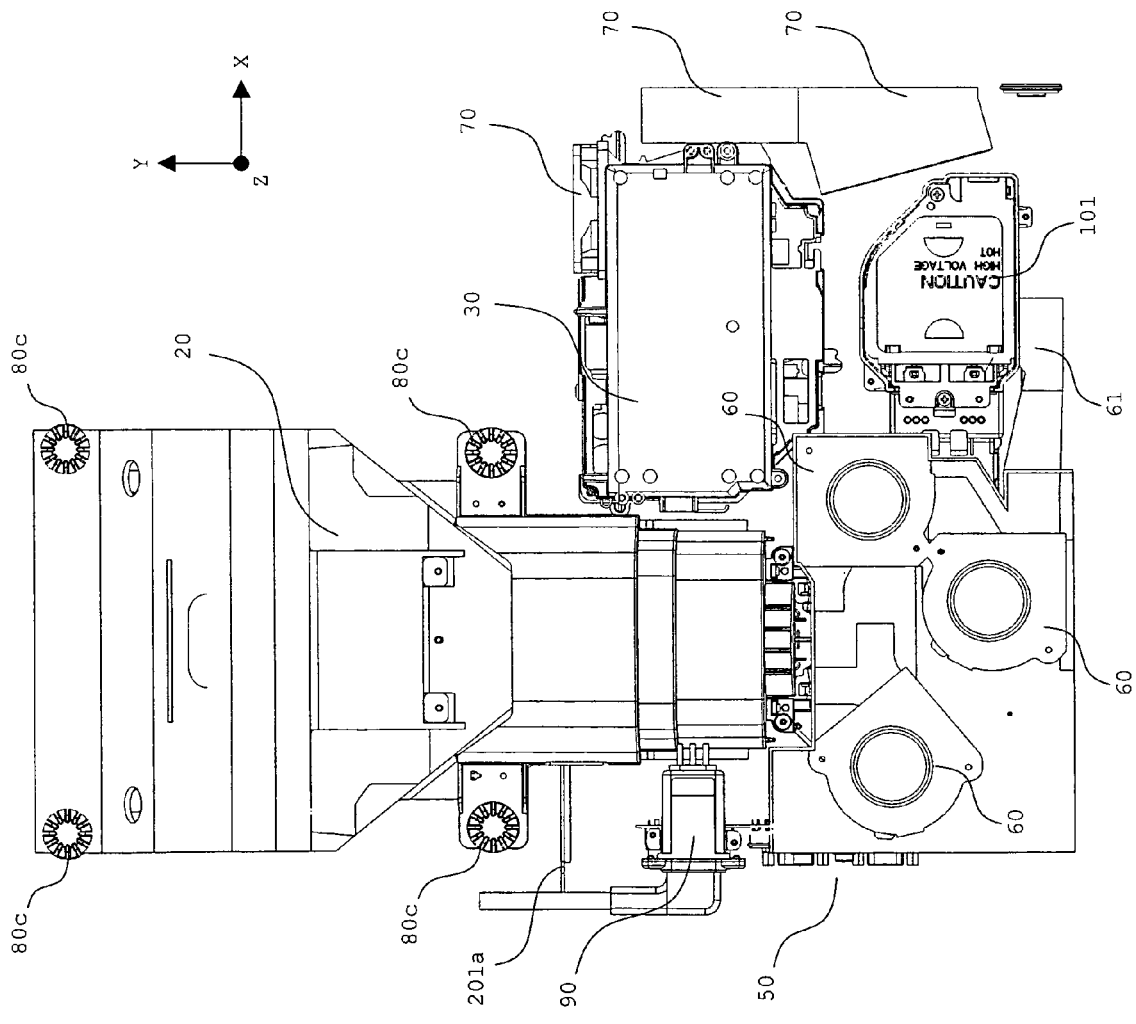
FIG. 3 is a diagram (bottom plan view) illustrating the arrangement of the projector according to the embodiment.

In the projection optical system 20, plate-like sections 202a and 205a shown in FIG. 8 are sandwiched between the bosses 80a and 80b via two bushes 80c as shown in FIG. 1, FIG. 2, and FIG. 3 to be mounted in the cabinet. Since the projection optical system 20 is sandwiched via the bush 80c for vibration absorption, shock is hardly conveyed to the projection optical system 20. The projection optical system 20 is supported by the boss 80a from the top face side of the cabinet and the boss 80b from the bottom face side of the cabinet via the bush 80c for vibration absorption, thereby improving supporting strength.

The optical engine 10 separates white light from a light source 101 into light in a blue wavelength band, light in a green wavelength band, and light in a red wavelength band, and at the same time, modulates the light in respective wavelength bands by a corresponding display element (liquid crystal panel). Furthermore, the optical engine 10 executes color synthesis of the modulated light in the respective wavelength bands by a dichroic prism, and emits the synthesized light to the projection optical system 20. As shown in FIG. 2, the light source 101 is disposed so as to illuminate the light in a direction of an X-axis. Furthermore, the projection optical system 20 is disposed so that the optical axis may be positioned in a direction of a Y-axis. An arrangement of the optical engine 10 and a positional relationship between the optical engine 10 and the projection optical system 20 will be described later, referring to FIG. 10.

The power supply unit 30 supplies electric power to the light source 101 and a main circuit 40. AC voltage is input to the power supply unit 30 via an AC inlet 90. The main circuit 40 is a circuit for driving and controlling the projector. As shown in FIG. 1, a circuit substrate for holding the main circuit 40 is disposed on the top face of the optical engine 10 to cover a part of the optical engine 10. Furthermore, an AV (Audio Visual) signal is input to the main circuit 40 via the AV terminal section 50.

Figure 5:
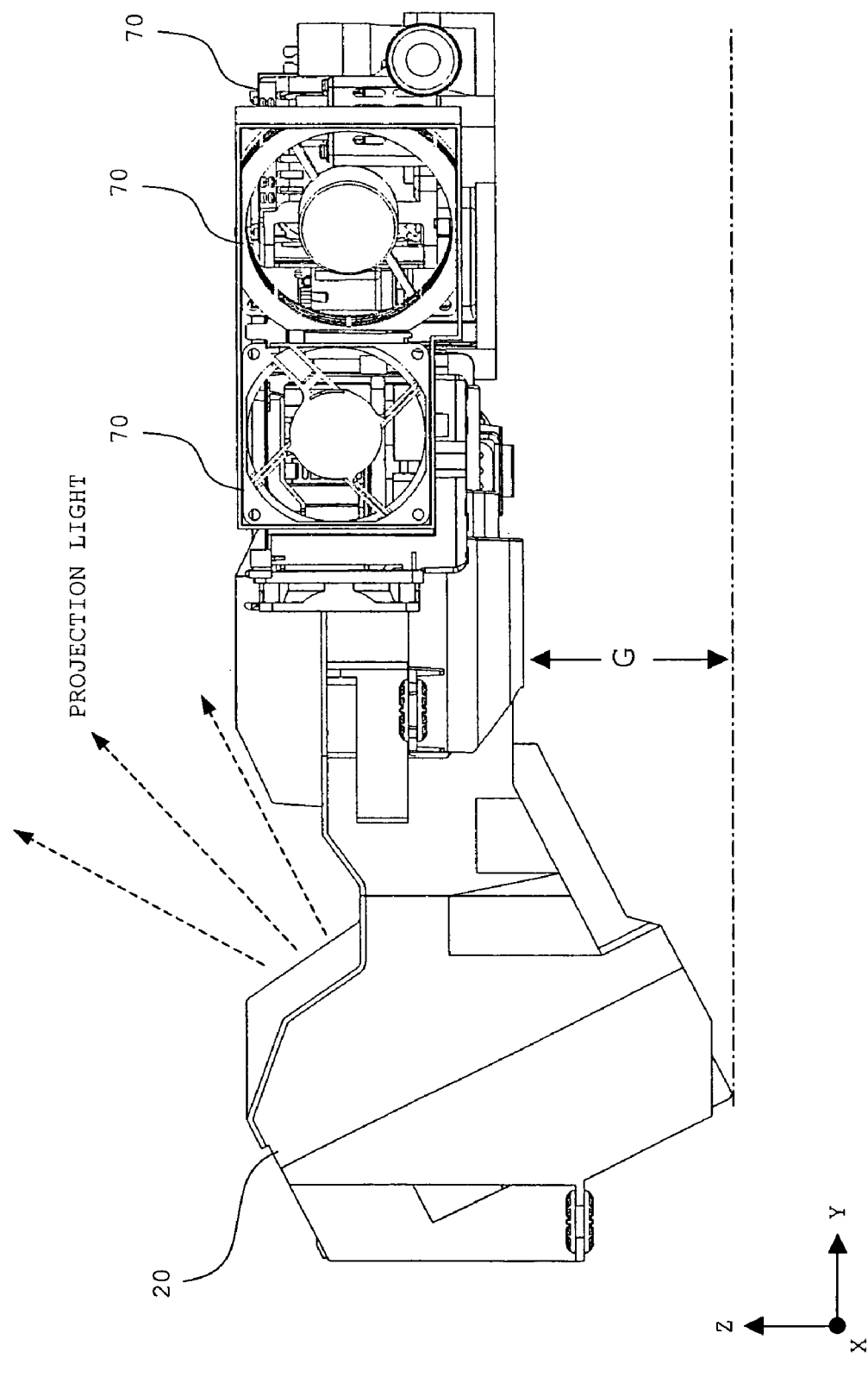
FIG. 5 is a diagram (left side view) illustrating the arrangement of the projector according to the embodiment.
Figure 6:
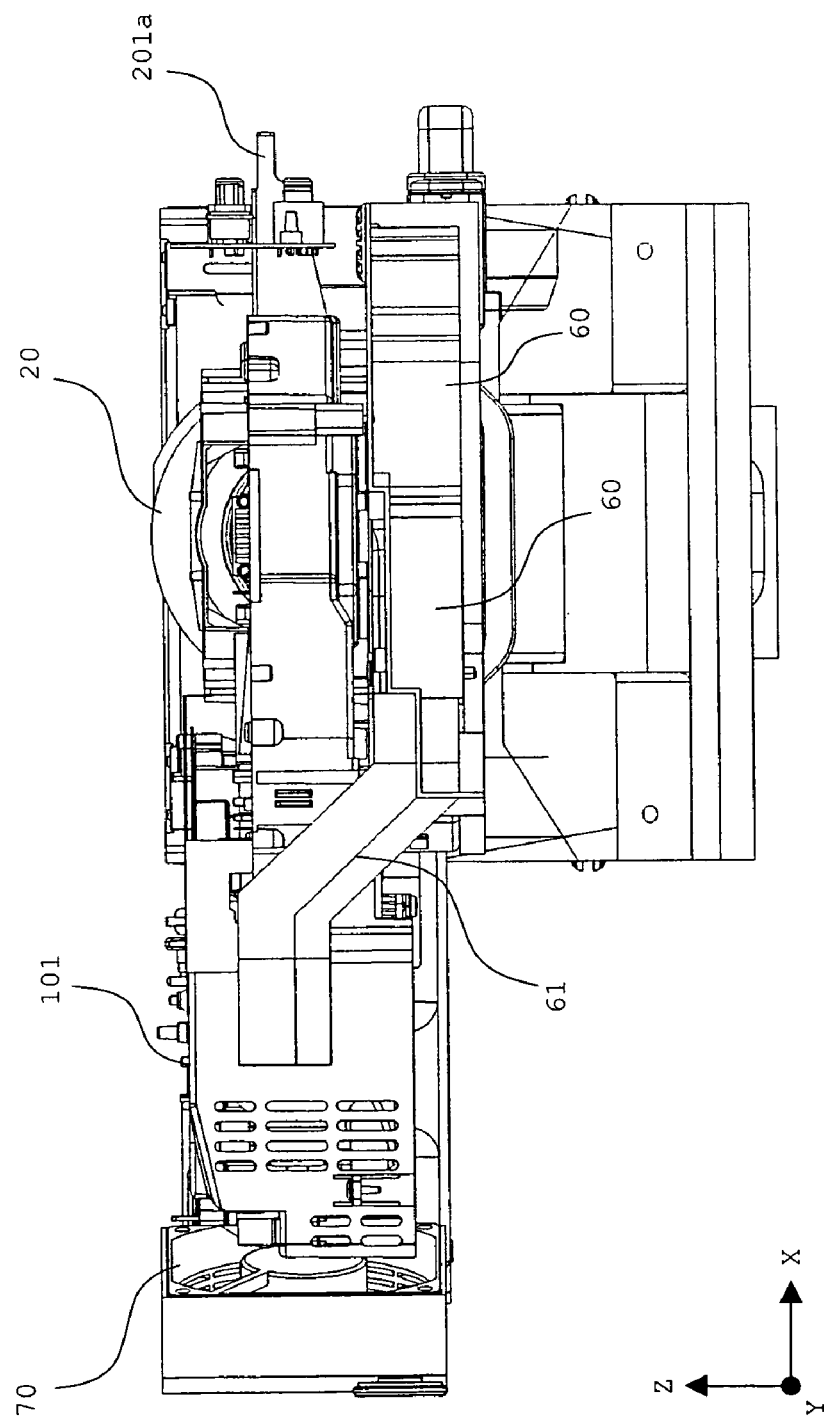
FIG. 6 is a diagram (front view) illustrating the arrangement of the projector according to the embodiment.
Figure 7:
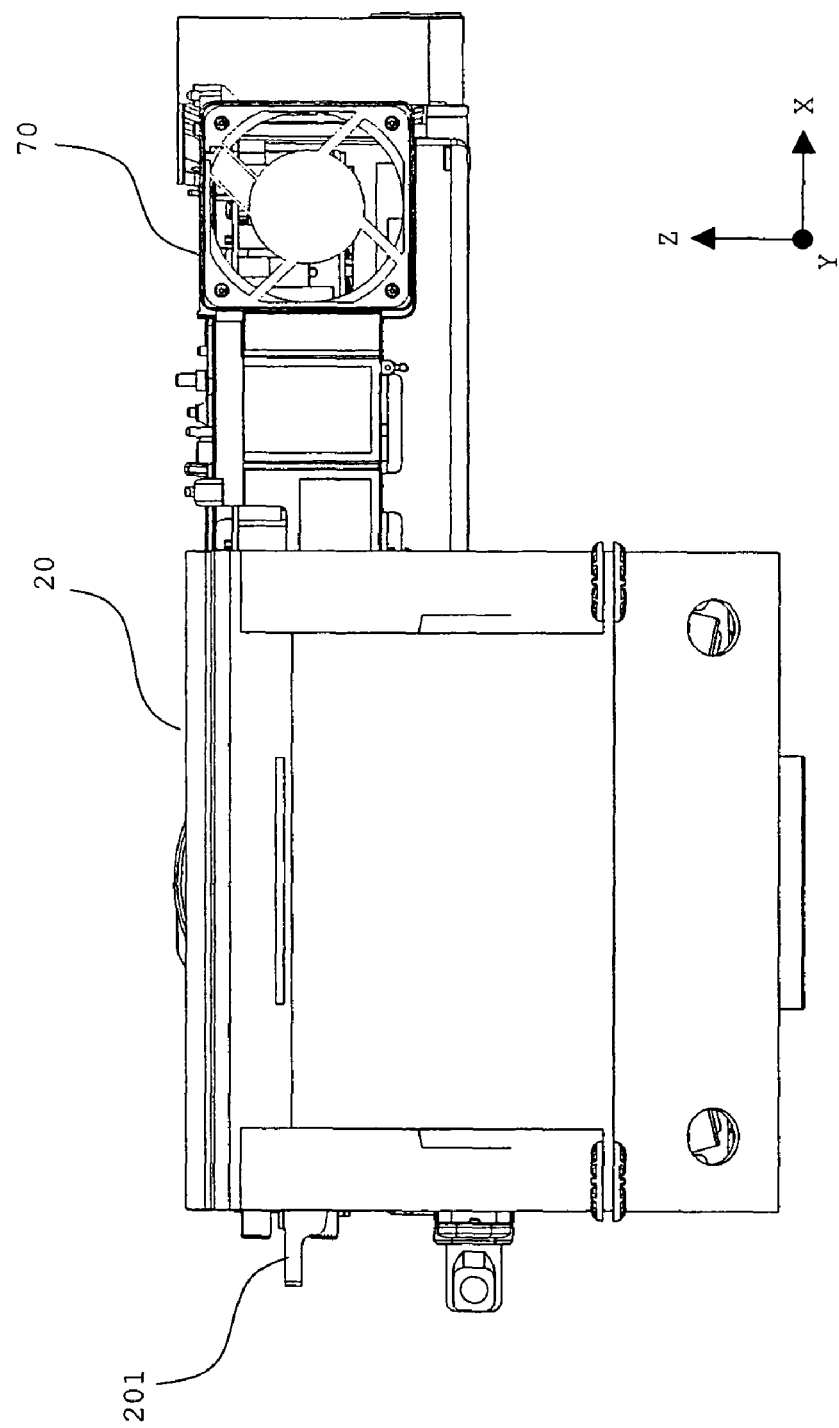
FIG. 7 is a diagram (back view) illustrating the arrangement of the projector according to the embodiment.

As shown in FIG. 1 and FIG. 3, three suction fans 60 are disposed on the bottom face side of the optical engine 10. Air sucked by these suction fans 60 is exhausted by an exhaust fan 70 (see FIG. 5) disposed on a left side surface of the optical engine 10 and an exhaust fan 70 (see FIG. 7) disposed on a rear surface of the optical engine 10. Disposition of the suction fans 60 and exhaust fans 70 as mentioned above allows the air sucked by the suction fan 60 to flow passing through an optical system of the optical engine 10, the light source 101, and the power supply unit 30. Furthermore, as shown in FIG. 2, FIG. 3, and FIG. 6, the sucked air is guided to a side surface of the light source 101 via a duct 61 and flows from the side surface of the light source 101 to the exhaust fan 70. Such air flow removes heat generated in these members.

FIG. 8 and FIG. 9 are respectively a perspective view and a cross-sectional view of the projection optical system showing the external appearance. FIG. 9 schematically illustrates an A-A' section in FIG. 8.

In FIG. 8 and FIG. 9, reference number 201 denotes a projection lens unit, reference number 202 denotes a housing, reference number 203 denotes a dust cover, reference number 204 denotes a reflection mirror, reference number 205 denotes a mirror cover, and reference number 206 denotes a light beam passing window (equivalent to a projection port of the present invention).

The projection lens unit 201 comprises a group of lenses for image formation of the projection light onto an intermediate image formation plane, and an actuator for adjusting a focus state of the projected image by displacing a part of the group of lenses in a direction of an optical axis. Here, focus adjustment of the projection lens unit 201 is carried out by rotating a lever 201a around the optical axis of the projection lens unit 201. As shown in FIG. 8, the lever 201a is disposed to protrude from a side surface of the projection lens unit 201 without blocking the projection light from the light beam passing window 206.

The reflection mirror 204 has a reflection plane having an aspheric shape, widens an angle of the projection light entered from the projection lens unit 201, and projects it from the light beam passing window 206 to a projection plane (screen).

The projection lens unit 201 is accommodated in the housing 202, and further, is covered by the dust cover 203. The reflection mirror 204 is attached to the housing 202 and is also covered by the mirror cover 205.

As shown in FIG. 9, synthesized light generated by the optical engine 10 is entered to the projection lens unit 201 at a position spaced from the optical axis of the projection lens unit 201 in a direction of a Z-axis. The synthesized light entered as mentioned is subjected to a lens action by the projection lens unit 201 and is entered to the reflection mirror 204. Following this, the angle of the synthesized light is widened by the reflection mirror 204 and is projected on the projection plane (screen) via the light beam passing window 206.

Figure 4:
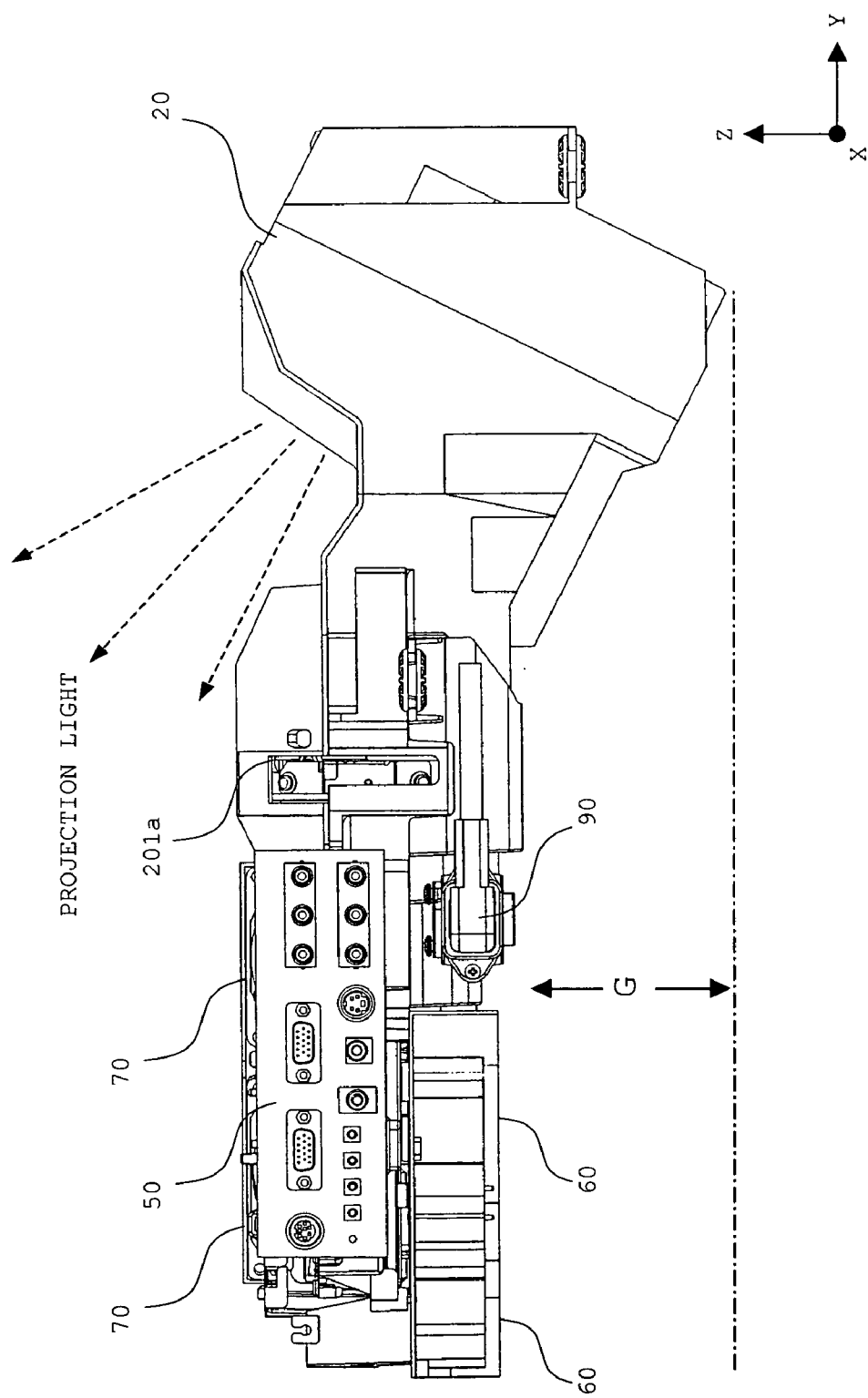
FIG. 4 is a diagram (right side view) illustrating the arrangement of the projector according to the embodiment.

As mentioned above, the synthesized light from the optical engine 10 is entered to the projection lens unit 201 at the position shifted from the optical axis of the projection lens unit 201 in the direction of the Z-axis. Therefore, the reflection mirror 204 is disposed to be shifted from the optical axis of the projection lens unit 201 in the direction opposite to the direction of the synthesized light being shifted, as shown in FIG. 9. Here, since the reflection mirror 204 has a larger reflection plane than a lens surface of each of the lenses constituting the projection lens unit 201, an amount of shifting the reflection mirror 204 with regard to the optical axis of the projection lens unit 201 becomes comparatively larger. For this reason, a comparatively large space G is created on the bottom face side of the projector as shown in FIG. 4 and FIG. 5.

Next, referring to FIG. 10, a principal arrangement of the optical engine 10 will be described.

The light source 101 comprises a burner and a reflector and emits approximately parallel light to an illumination optical system 102. The light source 101 includes, for example, an extra high pressure mercury lamp. The illumination optical system 102 comprises a fly-eye integrator, a PBS (polarization beam splitter) array and a condenser lens. The illumination optical system 102 uniformizes distribution of light quantity of the light of the respective colors when the light are entered to the display elements (liquid crystal panels) 106, 109, and 115, and arranges a direction of polarization of the light traveling to a dichroic mirror 103 in one direction. The light source 101 may be a single light type equipped with only one lamp comprising a burner and a reflector, or a multiple light type equipped with a plurality of lamps.

The dichroic mirror 103 reflects only the light in the blue wavelength band (hereafter, referred to as "B-light"), among the light entered from the illumination optical system 102, and transmits the light in the red wavelength band (hereafter, referred to as "R-light"), and the light in the green wavelength band (hereafter, referred to as "G-light"). A mirror 104 reflects the B-light reflected by the dichroic mirror 103 to a direction to a condenser lens 105.

The condenser lens 105 gives a lens action to the B-light so that the B-light is entered to the display element 106 in a state of parallel light. The display element 106 is driven in response to an image signal for a blue color and modulates the B-light in response to a driven state of the display element 106. A polarization plate (not shown) is disposed at an incident side and emitting side of the display element 106.

A dichroic mirror 107 reflects the G-light only of the R-light and G-light transmitted through the dichroic mirror 103. A condenser lens 108 gives a lens action to the G-light so that the G-light is entered to the display element 109 in a state of parallel light. The display element 109 is driven in response to an image signal for a green color and modulates the G-light in response to a driven state of the display element 109. A polarization plate (not shown) is disposed at an incident side and emitting side of the display element 109.

Relay lenses 110 and 112 give a lens action to the R-light so that an incident state of the R-light with regard to the display element 115 becomes identical with incident states of the B-light and G-light with regard to the display elements 106 and 109. Mirrors 111 and 113 change the optical path of the R-light so as to guide the R-light transmitted through the dichroic mirror 107 to the display element 115.

A condenser lens 114 gives a lens action to the R-light so that the R-light is entered to the display element 115 in a state of parallel light. The display element 115 is driven in response to an image signal for a red color and modulates the R-light in response to a driven state of the display element 115. A polarization plate (not shown) is disposed at an incident side and emitting side of the display element 115.

For the B-light, G-light, and R-light modulated by the display element 106, 109, and 115, a dichroic prism 116 reflects the B-light and R-light, and at the same time, transmits the G-light, thereby performing color synthesis of the B-light, G-light, and R-light. As mentioned above, the color synthesized light (synthesized light) is entered to the projection lens unit 201 in the projection optical system 20. Then, an angle of the synthesized light is widened by the reflection mirror 204, and the synthesized light is projected to the projection plane (screen) via the light beam passing window 206.

As illustrated, the light source 101 is disposed so that a direction of light illumination directs in a direction of the X-axis. With this arrangement of the light source 101, the light source 101 is positioned to illuminate light in the horizontal direction even when the projector is used in any state in use, i.e., used as the ceiling mount type, the stationary type, or the desk mount type. Accordingly, reduction in the service life of the light source 101 due to disposition of the light source 101 in the vertical direction can be suppressed.

Figure 10:
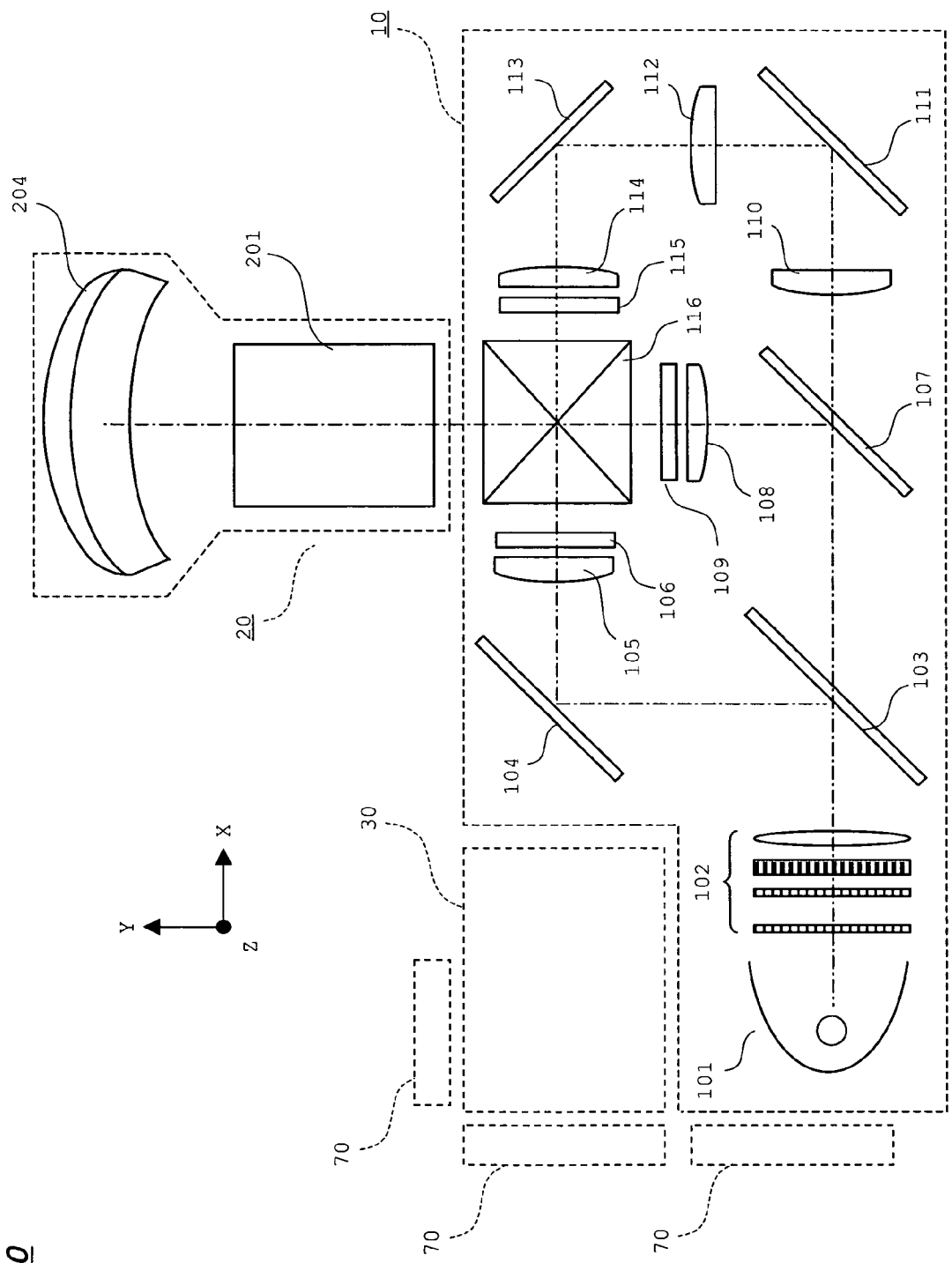
FIG. 10 is a diagram illustrating an arrangement of an optical engine according to the embodiment.

Furthermore, as shown in FIG. 2 and FIG. 10, since the light source 101 is disposed so that the optical axis of the light source 101 may intersect orthogonal to the optical axis of the projection lens unit 201, a dimension of the optical engine 10 in the direction of the optical axis of the projection lens unit 201 can be suppressed. Therefore, a projection distance can be shortened and as a result, a possibility that before reaching the screen, the light emitted from the light beam passing window 206 is blocked by obstacles can be reduced.

Figure 11:
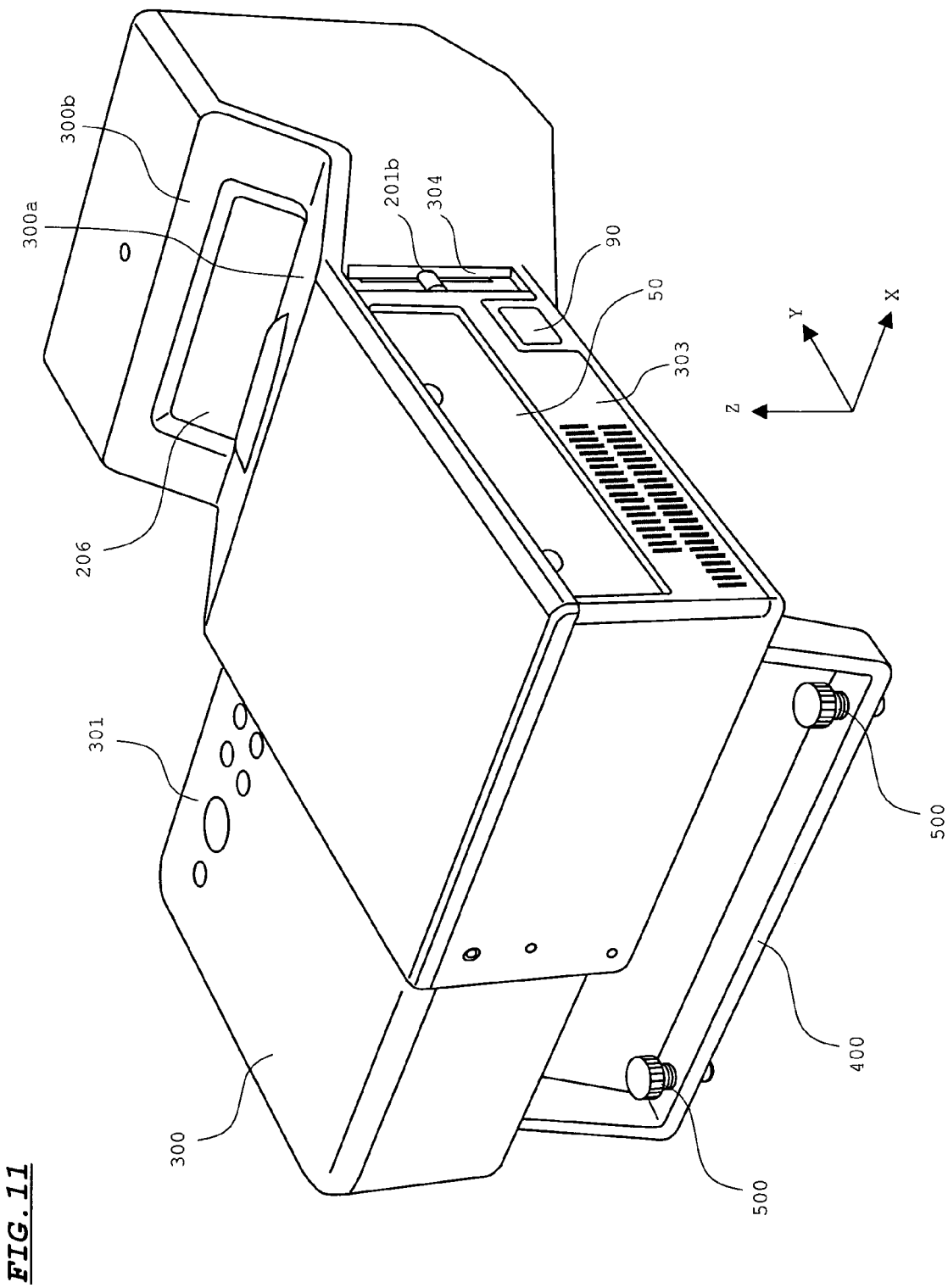
FIG. 11 is a diagram (perspective view) illustrating an external arrangement of the projector according to the embodiment.
Figure 12:
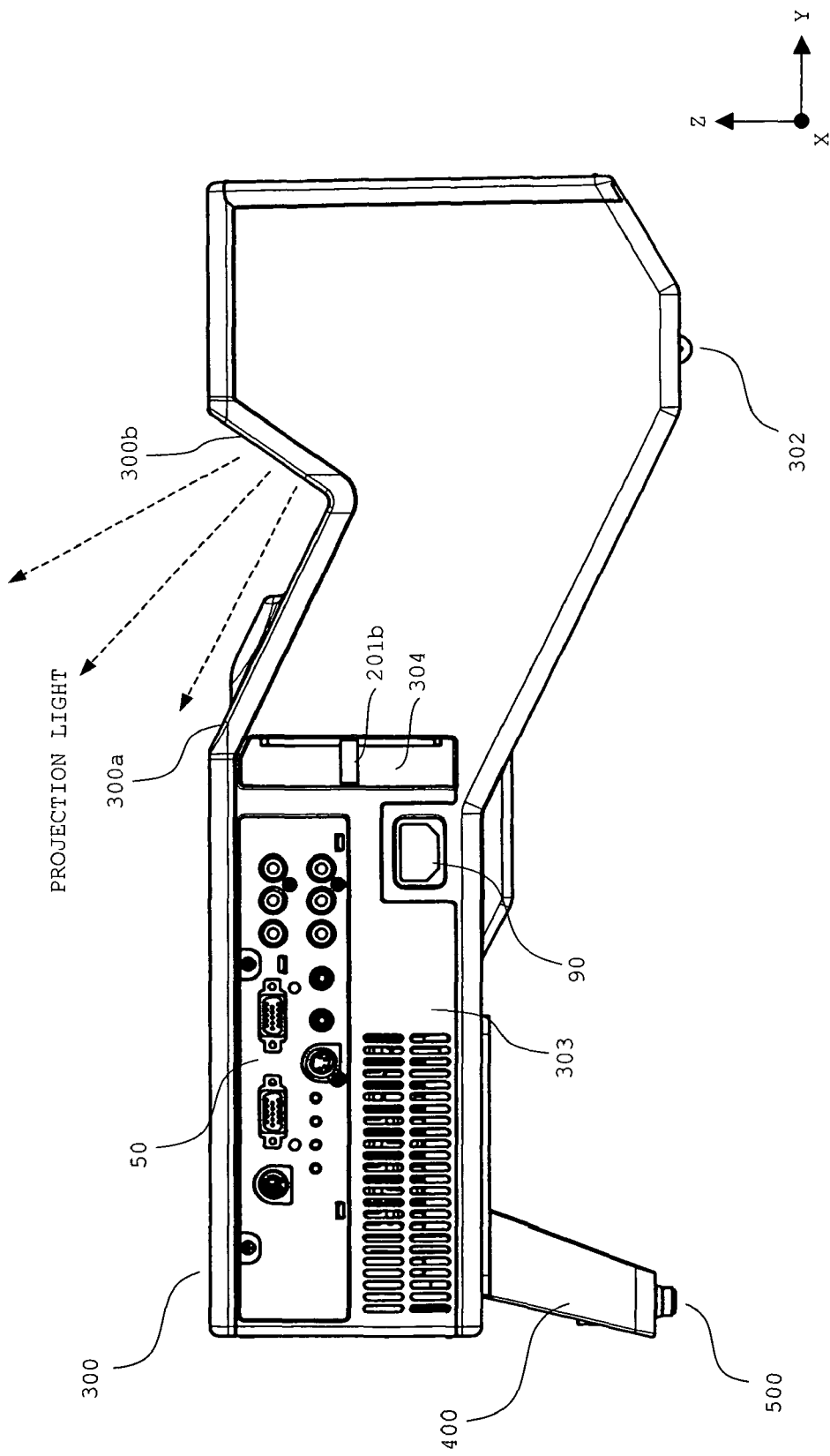
FIG. 12 is a diagram (right side view) illustrating the external arrangement of the projector according to the embodiment.

FIG. 11 is a diagram (perspective view) illustrating an external appearance of the projector where an internal structure of the projector shown in FIG. 1 is accommodated in the cabinet. Likewise, FIG. 12 is a right side view of the projector. In FIG. 12, each terminal of the AV terminal section 50 is omitted.

As illustrated, to correct the level difference created depending on the above-mentioned space G (see FIG. 4 and FIG. 5), an arm member 400 is attached to the bottom face of the main body cabinet 300. Furthermore, two adjusting screws 500 are attached to the arm member 400 so that end portions of the screws may penetrate through the arm member 400.

An operation button section 301 is disposed on the top face of the main body cabinet 300. A protrusion 302 having a circular arc shape is disposed on the bottom face of the main body cabinet 300 at a position where the reflection mirror 204 is disposed.

On a top face of the main body cabinet 300 are formed a down slope surface 300a forwardly descending and an up slope surface 300b forwardly ascending continuing to the down slope surface. The up slope surface 300b faces upwardly and obliquely in a rear direction, and the above-mentioned light beam passing window 206 is disposed on this surface.

A portion of the right side face of the main body cabinet 300 has an opening, and a side face panel 303 is inserted into the opening. Each terminal of the above-mentioned AV terminal section 50 is disposed on the side face panel 303. Furthermore, a knob accommodation section 304 is formed to a front end portion of the side face panel 303. A knob section 201b of a lever 201a for focus adjustment as mentioned above is disposed in the knob accommodation section 304.

Figure 13:
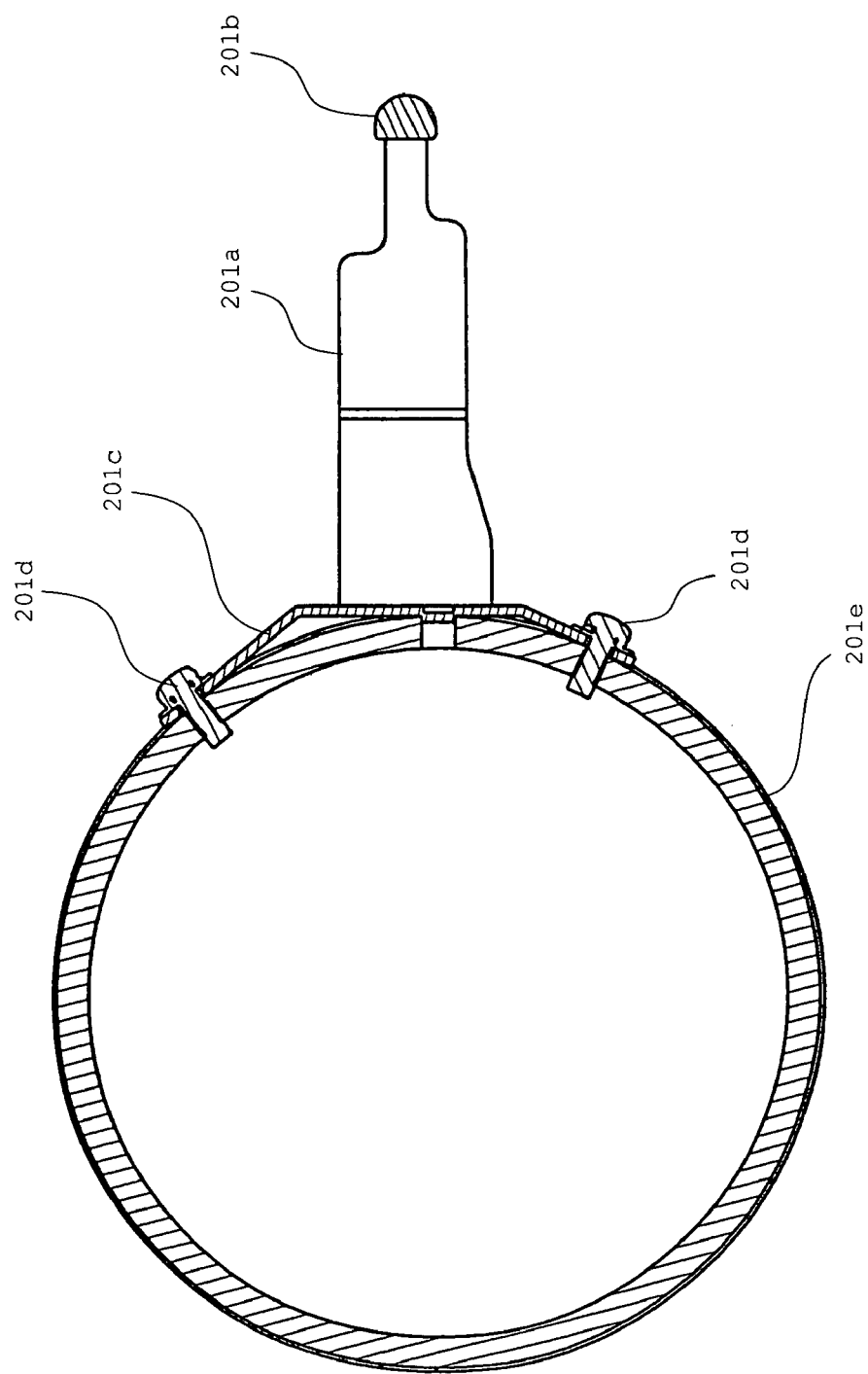
FIG. 13 is a diagram illustrating an arrangement of a lever according to the embodiment.

As for the lever 201a, as shown in FIG. 13, a attaching part 201c being formed in a base end portion thereof is fixed to an operation cylinder 201e of the projection lens unit 201 by a screw 201d. The operation cylinder 201e is one component constituting an actuator for displacing the lens in the projection lens unit 201. The lever 201a extends from the operation cylinder 201e to the side, and a knob section 201b is provided at an end portion thereof. The lever 201a is configured so as to rotate from an approximately horizontal state to clockwise or counterclockwise in FIG. 13 within a predetermined range (e.g., 20 degrees each).

FIG. 14A and FIG. 14B are diagrams illustrating a relationship of an arrangement between the knob accommodation section 304 and the lever 201a on the side face panel 303. In FIG. 14A and FIG. 14B, an arrangement of components other than the lever 201a and the side face panel 303 is omitted.

The knob accommodation section 304 is a portion serving as an operation region of the knob section 201b and has an elongated groove-shape depressed from the side face of the main body cabinet 300. A bottom face 304a of the knob accommodation section 304 has a curved shape externally projecting. A center of a curvature of the bottom face 304a serves as a rotation center of the lever 201a, i.e., the optical axis of the projection lens unit 201. A slit 304b is formed on the bottom face of the knob accommodation section 304 over a range of rotation of the lever 201a. The lever 201a passes through the slit 304b and exposes into the knob accommodation section 304.

The knob section 201b projects most laterally when the lever 201a is held in a horizontal state, and a length of the lever 201a or the like are determined so that the knob section 201b may not project from the depression of the knob accommodation section 304 (side face line of the main body cabinet 300) even in this state.

In this way, when the user moves the knob section 201b in the horizontal state in up/down directions as shown in FIG. 14A, the operation cylinder 201e accordingly rotates together with the lever 201a. When the operation cylinder 201e rotates, position of the lens in the projection lens unit 201 is displaced in the direction of the optical axis by a well-known interlocking mechanism such as a cam mechanism. This allows adjustment of a focus condition of the projected image.

FIG. 14B shows a state where the knob section 201b is upwardly moved. Since the bottom face 304a of the knob accommodation section 304 has a curved shape as mentioned above, the knob section 201b moves along with the bottom face 304a as shown in FIG. 14B without contacting with the bottom face 304a.

According to the present embodiment, the lever 201a for focus adjustment is disposed so as to be exposed from a right side face of the main body cabinet 300. Therefore, even when the projection light emitted from the light beam passing window 206 passes slightly above the top face of the main body cabinet 300 while gradually expanding, and travels to a projection plane, the projection light is not blocked by the lever 201a, i.e., by the knob section 201b of the lever 201a exposed from the main body cabinet 300, and there is no possibility that a shadow is cast on the projected image. Furthermore, as mentioned, since the knob section 201b is disposed on the side face of the main body cabinet 300, blocking of the projection light by fingers manipulating the knob section 201b can be prevented.

In addition, according to the present embodiment, since the knob section 201b does not project from the side face of the main body cabinet 300, such a trouble hardly occurs that the knob section 201b is caught by some objects and is broken when the projector is moved.

Moreover, according to the present embodiment, since the lever 201a is long and a distance between the knob section 201b and the operation cylinder 201e is spaced, an amount of rotation of the operation cylinder 201e when the knob section 201b is moved by the same amount can be made smaller. Accordingly, fine focus adjustment may be easily performed.

In order to solve the problem that the fingers block the projection light, such an alternative may be used that the lever 201a for focus adjustment is interlocked separately by an interlocking mechanism or the like, and focus adjustment is carried out at a position where the fingers do not block the projection light. For example, a manipulation knob sliding in the same direction as the lever 201a slides is disposed on the side face of the main body cabinet in a direction of the lever 201a projecting, and this manipulation knob and the lever 201a are linked by an interlocking mechanism. In this case, the manipulation knob is disposed at a position shifted from, for example, a position where the lever 201a is disposed, towards the space G in FIG. 4. By disposing the manipulation knob in this position, the fingers do not block the projection light even when the manipulation knob is manipulated during focus adjustment.

While the embodiment according to the present invention has been described, the present invention is not limited by the above-mentioned embodiment. For example, according to the above-mentioned embodiment, the arrangement used is such that only focus adjustment is allowed in the projection lens unit, the present invention is not limited thereto, other arrangement that allows zoom adjustment as well as focus adjustment, or still other arrangement that allows only zoom adjustment may be employed. In this case, an arrangement of the operation section for zoom adjustment may be used for the arrangement of the operation section of the present invention. It should be understood that various other modifications and variations may be made to the embodiment of the present invention.

What is claimed is:

1. A projection display device comprising:
   a projection lens section to which light modulated by a light modulating element is entered;
   a mirror section which receives light emitted from the projection lens section and reflects the received light to a projection plane that is external from the projection display device and on which an image is projected;
   a main body cabinet that houses the projection lens section and the mirror section, the main body cabinet including a V-shaped concave groove that is concave toward an interior of the main body cabinet, the V-shaped concave groove including a first sloped portion and a second sloped portion that slopes in a direction of the light reflected by the mirror section;
   a projection port provided in the main body cabinet through which the light reflected by the mirror section passes to the projection plane, the projection port being provided in the first sloped portion of the V-shaped concave groove in the main body cabinet; and
   an operation section which displaces a lens in the projection lens section,
   wherein an optical path of the light reflected by the mirror section through the projection port is directed to pass over a portion of the main body cabinet that houses the projection lens section, and
   wherein the operation section is disposed in a side of the main body cabinet, other than a side of the main body cabinet in which the projection port is disposed, and the operation section is disposed so that the operation section does not hinder an optical path of the light that has been reflected by the mirror section through the projection port provided in the main body cabinet.

2. The projection display device according to claim 1, wherein
   the operation section is disposed in a side face region other than a side face region at the projection port side occupied by the optical path of the light that has been passed through the projection port, of a side face region on the main body cabinet, when the main body cabinet is viewed from the projection port side.

3. The projection display device according to claim 2, wherein
   the operation section is externally exposed from a left side face of the main body cabinet or a right side face of the main body cabinet when the main body cabinet is viewed from the projection port side.

4. The projection display device according to claim 3, wherein the operation section includes:
   a knob section touched by a user at manipulation; and
   an accommodation section depressed from the side face of the main body cabinet and provided in the left side face of the main body cabinet or the right side face of the main body cabinet, and
   the knob section is accommodated in the accommodation section so that the knob section may not project from the side face of the main body cabinet.

* * * * *